United States Patent

Shen et al.

[11] Patent Number: 6,130,984
[45] Date of Patent: *Oct. 10, 2000

[54] MINIATURE VARIABLE OPTICAL ATTENUATOR

[75] Inventors: Ronggui Shen, Sunnyvale; Jingyu Xu, San Jose; Jing-Jong Pan, Milpitas, all of Calif.

[73] Assignee: E-Tek Dynamics, Inc., San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 09/034,631

[22] Filed: Mar. 4, 1998

Related U.S. Application Data

[63] Continuation-in-part of application No. 08/884,880, Jun. 30, 1997.
[60] Provisional application No. 60/047,076, May 19, 1997.

[51] Int. Cl.[7] .............................. G02B 6/32; G02B 26/00
[52] U.S. Cl. ............................................. 385/140; 385/47
[58] Field of Search ..................... 385/140, 47; 359/888, 359/889

[56] References Cited

U.S. PATENT DOCUMENTS

| | | | |
|---|---|---|---|
| 4,702,549 | 10/1987 | Duck et al. | 385/140 |
| 4,989,938 | 2/1991 | Tamulevich | 385/140 |
| 5,087,122 | 2/1992 | Ostrander et al. | 356/73.1 |
| 5,226,104 | 7/1993 | Unterleitner et al. | 385/140 |
| 5,506,731 | 4/1996 | Smiley | 359/822 |
| 5,555,330 | 9/1996 | Pan et al. | 385/39 |
| 5,745,634 | 4/1998 | Garrett et al. | 385/140 |
| 5,781,341 | 7/1998 | Lee | 359/578 |
| 5,799,121 | 8/1998 | Duck et al. | 385/47 |
| 5,889,904 | 3/1999 | Pan et al. | 385/24 |
| 5,900,983 | 5/1999 | Ford et al. | 385/140 |
| 5,999,669 | 12/1999 | Pan et al. | 385/18 |

Primary Examiner—John D. Lee
Assistant Examiner—Michael J. Stahl
Attorney, Agent, or Firm—Townsend Townsend & Crew LLP; Mark D. Barrish, Esq.

[57] ABSTRACT

A variable optical attenuator controllably filters an optical signal after the signal has been expanded and collimated. The optical signals are optionally expanded and refocused by a single GRIN lens, the signal passing through a variable filter between the GRIN lens and a reflector, and again between the reflector and the GRIN lens. Both the input and output fibers can be held within a single sleeve in alignment with the GRIN lens. Alternatively, separate input and output GRIN lenses may be used. The amount of attenuation can be indicated by a potentiometer.

16 Claims, 3 Drawing Sheets

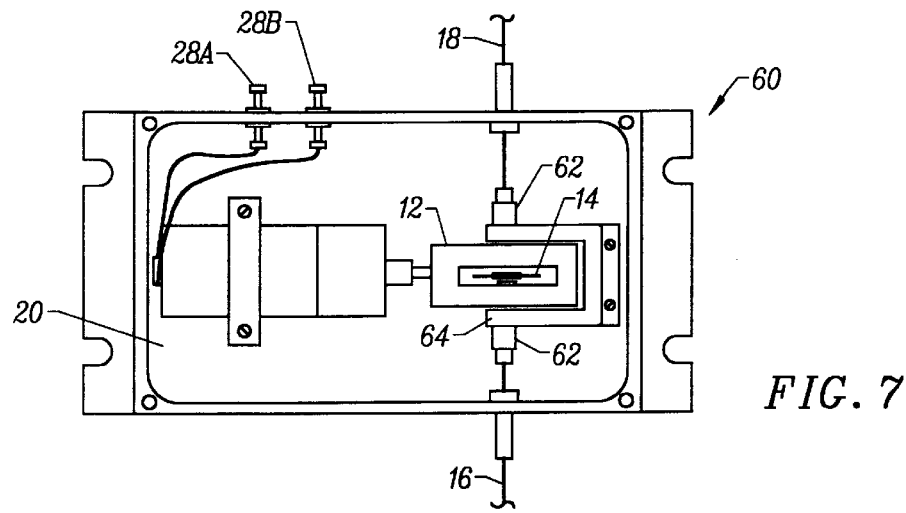
FIG. 7
| Wavelen. nm | Loss (dB) | | | | PDL (dB) | | | |
|---|---|---|---|---|---|---|---|---|
| | 1st | 2nd | 3rd | 4th | 1st | 2nd | 3rd | 4th |
| 1500.00 | 0.385 | 4.753 | 9.650 | 14.673 | 0.007 | 0.012 | 0.005 | 0.011 |
| 1510.00 | 0.395 | 4.767 | 9.987 | 15.007 | 0.005 | 0.009 | 0.011 | 0.022 |
| 1520.00 | 0.401 | 4.934 | 9.907 | 14.976 | 0.006 | 0.013 | 0.014 | 0.022 |
| 1530.00 | 0.417 | 4.798 | 9.776 | 14.766 | 0.005 | 0.013 | 0.012 | 0.018 |
| 1540.00 | 0.420 | 4.855 | 10.066 | 15.069 | 0.007 | 0.014 | 0.028 | 0.029 |
| 1550.00 | 0.433 | 5.000 | 10.020 | 15.065 | 0.010 | 0.017 | 0.018 | 0.026 |
| 1560.00 | 0.436 | 4.894 | 9.851 | 14.852 | 0.010 | 0.016 | 0.014 | 0.019 |
FIG. 8
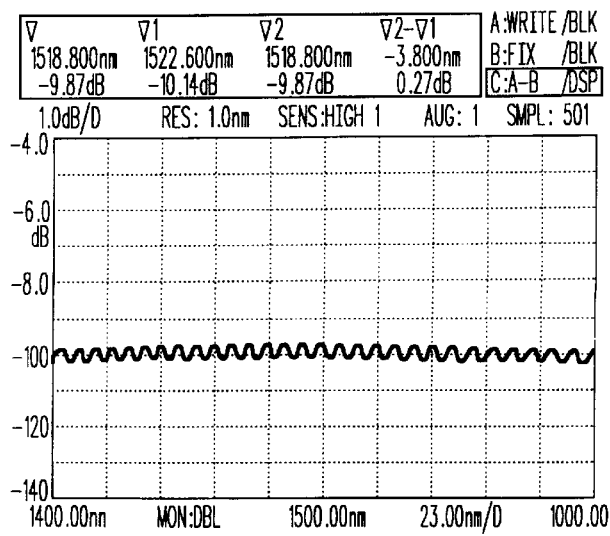
FIG. 9

MINIATURE VARIABLE OPTICAL ATTENUATOR

CROSS-REFERENCE TO RELATED APPLICATIONS

This application is a continuation-in-part of, and claims the benefit of and priority from, U.S. Provisional Patent Application Serial No. 60/047,076, filed May 19, 1997, and U.S. patent application Ser. No. 08/884,880, filed Jun. 30, 1997 the full disclosures of which are incorporated herein by reference.

BACKGROUND OF THE INVENTION

The present invention is generally related to optic fiber networks, and in particular, provides an attenuator for controllably varying the strength of an optical signal.

In fiber optic networks, light signals are transmitted along optical fibers to transfer information from one location to another. It is often desirable to tailor the power of optical signals within optical fiber networks. For example, the individual components of an optical fiber network may be tested using a low power optical signal to simulate fiber optic telecommunications or data communications over a long distance. Tailoring of optical signal strengths is desirable within automatic optical testing systems, optical signal routing systems, optical sensor arrays, and the like.

Although the propagation of light signals within optical fibers is somewhat analogous to the transmission of electronic data along metal wires, manipulating the strength of an optical signal within an optical fiber is more problematic than varying the strength of an electrical signal along a wire. Electrical signal strength can be varied simply by generating a different input voltage, or by coupling the wire to a ground through a variable resistor. Optical signals are typically generated by laser diodes, and, unfortunately, laser diodes can be less flexible than electrical signal generators.

Furthermore, once the signal has entered the optical fiber, selectably and repeatably removing or blocking a portion of the optical signal is more challenging than simply varying a resistor. Although optical signals can be filtered while they are transmitted between aligned ends of optical fibers, such arrangements are susceptible to both misalignment and contamination. Single mode optical fibers are particularly susceptible to such misalignment and contamination, as their core diameters are typically as small as 2 to 10 $\mu$m. Hence, even minute particles can block a substantial portion of the signal.

In light of the above, it would be desirable to provide improved structures and methods for attenuating optical signals. It would be particularly desirable if such improved structures avoided precise alignment requirements, and were controllably and repeatably variable throughout a wide range of attenuation values.

SUMMARY OF THE INVENTION

The present invention provides improved optical attenuators which generally filter an optical signal after the signal has been radially expanded by a collimating lens. Such signal expansion decreases the attenuator's sensitivity to misalignment and contamination. In a first arrangement, the optical signals are expanded and refocused by a single GRIN lens, with the signal passing twice through a variable filter: a first time when transmitted from the GRIN lens, and a second time when travelling back toward the GRIN lens from a reflector. Assembly of the attenuator may be simplified by aligning both the input and output fibers within a single sleeve. Alternative attenuator structures make use of separate collimating lenses to expand and then refocus the optical signal. An electrical signal which indicates the amount of attenuation can be provided by using a potentiometer actuation mechanism to vary the filter between the GRIN lens and the reflector, resulting in a low cost, highly accurate variable attenuator.

In a first aspect, the present invention provides a variable attenuator comprising an electrical component having a body and an element. The body defines a path along which the element moves to vary an electrical characteristic of the component. An output optical fiber is disposed in a optical path of an optical signal from an input optical fiber, and an optical filter having a filter density which varies between a lower density region and a higher density region is coupled to the component. An effective region of the filter is disposed in the optical path between the input fiber and the output fiber. The element of the component moves along the path as the effective filter region moves between the lower density region and the higher density region of the filter, thereby allowing the electrical characteristic of the wiper to indicate effective attenuation.

Preferably, the variable attenuator of the present invention makes use of a potentiometer actuation mechanism, ideally by mounting the filter to a wiper of the potentiometer. More generally, any electrical component having a movable element might be used (for example, a variable capacitor, a potentiometer, etc.) by mounting the filter to either the body or the movable element, and by mounting the optical fibers to the other. The element may rotate and/or move linearly, while a linear screw element actuation mechanism is particularly preferred.

In another aspect, the present invention provides an attenuator comprising a sleeve having a first end and a second end. An input optical fiber is disposed within the sleeve, and has an end adjacent to the second end of the sleeve. An output optical fiber is also disposed within the sleeve with an end adjacent to the second end of the sleeve. A GRIN lens is adjacent to the second end of the sleeve. The GRIN lens has a length of approximately a quarter pitch, and is aligned to expand an optical signal from the input fiber. A reflector is disposed in the optical path of the optical signal from the GRIN lens, and is aligned to direct the signal back through the GRIN lens and into the output fiber. An optical filter is disposed in the expanded optical path between the GRIN lens and the reflector. Typically, the filter will have a variable effective filter density to vary the strength of the optical signal which enters the output fiber.

In yet another aspect, the present invention provides a variable attenuator comprising a potentiometer having a body that defines a path, a wiper, and a rotatable screw coupling the wiper to the body. This allows the screw to translate the wiper along the path when the screw rotates relative to the body. A first GRIN lens is disposed in an optical path of an optical signal from an input fiber to expand the optical signal, and is affixed relative to the body of the potentiometer. A second GRIN lens is disposed in the expanded optical path of the optical signal from the first GRIN lens to focus the expanded optical signal into an output optical fiber. An optical filter has an effective filter region disposed in the optical path between the GRIN lenses, and a filter density which increases from a lower density region to a higher density region. The filter is coupled to the potentiometer so that the effective region moves between the lower density region and the higher density region when the screw rotates.

BRIEF DESCRIPTION OF THE DRAWINGS

FIG. 7 illustrates an alternative motor driven variable attenuator having a first GRIN lens for expanding the optical signal from an input fiber and a second GRIN lens for focussing the filtered optical signal into an output fiber, according to the principles of the present invention.

FIG. 8 is a table of test data showing the attenuation and polarization dependent loss (PDL) throughout a range of light wavelengths for the variable attenuator of the present invention.

FIG. 9 is a graph of the attenuation provided by the variable attenuator of the present invention throughout a range of light wavelengths, illustrating filter interference induced ripple.

DETAILED DESCRIPTION OF THE SPECIFIC EMBODIMENTS

The attenuator of the present invention will find applications in a wide variety of fiber optic networks, particularly within manual and automated optical testing systems, and also within fiber optic telecommunications and data communications systems and networks. The devices of the present invention will find further uses within optical sensor arrays, optical signal routing systems and test equipment, and the like.

Figure 1:
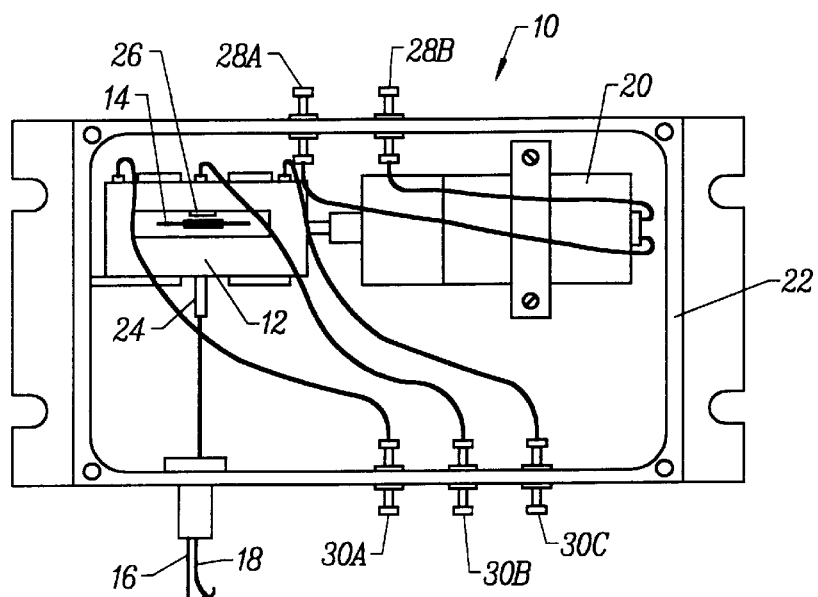
FIG. 1 is a top view of a motor driven variable optical attenuator, according to the principles of the present invention.

Referring now to FIG. 1, a switch attenuator 10 makes use of the moveable elements of a potentiometer 12 to position a variable neutral density filter 14. The filter moves within an optical path between an input fiber 16 and an output fiber 18. A geared electric motor 20 actuates the potentiometer, and the moveable components are protected within a housing 22.

Together with filter 14 and input and output fibers 16, 18 the optical components of attenuator 10 include a collimating assembly 24 and a reflector 26. These elements are aligned and used in a manner similar to that described in co-pending U.S. patent application Ser. No. 08/727,075, filed on Oct. 8, 1996, now U.S. Pat. No. 5,742,712 the full disclosure of which is incorporated herein by reference.

Motor connectors 28A and 28B are electrically coupled to the motor for actuating the filter from outside the housing, while potentiometer connectors 30A, 30B, and 30C are electrically coupled to the potentiometer to indicate the position of the filter relative to the optical path within attenuator 10.

Figure 2:
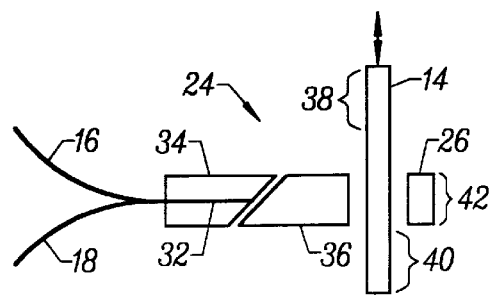
FIG. 2 is a schematic view of the optical components of the attenuator of FIG. 1.

The optical path within attenuator 10 can be understood with reference to FIG. 2. The ends of input fiber 16 and output fiber 18, which are preferably not fused together, are snugly held in an opening 32 through a glass sleeve or ferrule 34. Sleeve 34 has a slant angled face which is in close proximity with a reciprocally slanted face of a quarter pitch GRIN lens 36. The end sections of the input and output optical fibers are dejacketed. The core and cladding of each fiber are exposed, and the exposed cladding and core may or may not be tapered.

Filter 14 has a filter density which varies over the surface of the filter. Filter 14 comprises a substantially planar structure through which the optical path from GRIN lens 36 passes substantially perpendicularly. The filter density of filter 14 varies smoothly from a low density region 38 to a high density region 40, and the filter moves substantially along its plane so that an effective filter region 41 (through which the optical path passes) can be varied between these two extremes. Filter 14 is preferably neutral throughout the operating wavelength range of the attenuator, generally being throughout the range of 1,200 to 1,600 nm.

An exemplary neutral variable density filter is available commercially from E-Tek Dynamics, Inc. of San Jose, Calif. The exemplary structure has a lower density region with a filter density of less than about 0.001, and provides a maximum filter density of up to about 3. Other density values can be used, depending on the specific attenuator design requirements. The exemplary filter structure comprises a thin sheet of glass, both sides of which are coated with wideband antireflection coatings. A thin layer of a metal film (typically comprising chromium, nickel, or the like) also coats one side of the glass sheet, the metal coating varying in thickness to provide the variable filter density. Suitable antireflection coatings may be produced using electron beam evaporation, while the metal film is preferably deposited by ion sputtering with a shadow mask. Typical dimensions of the filter are about 6.0 mm by 3.0 mm by 0.2 mm. It should be understood that the variable attenuators of the present invention are adaptable to a wide variety of filter sizes, materials, fabrication techniques, and filter densities.

Figure 3:
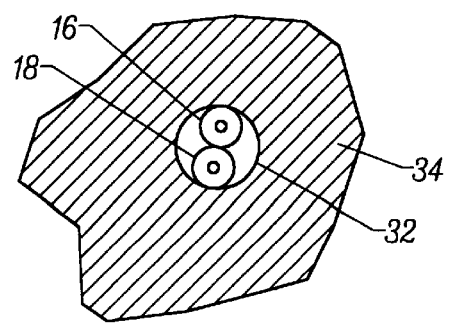
FIG. 3 is a cross-sectional view of the sleeve surrounding the input and output optical fibers for the attenuator of FIG. 1.

FIG. 3 is a detailed cross-sectional end view of the opening 32 through sleeve 34. In this example, the end sections of input and output fibers 16, 18 are untapered. Hence, the cross-sectional diameter of each of these single mode fibers is typically about 125 microns. The diameter of opening 32 is about 250 microns to snugly accommodate the fibers.

Figure 4:
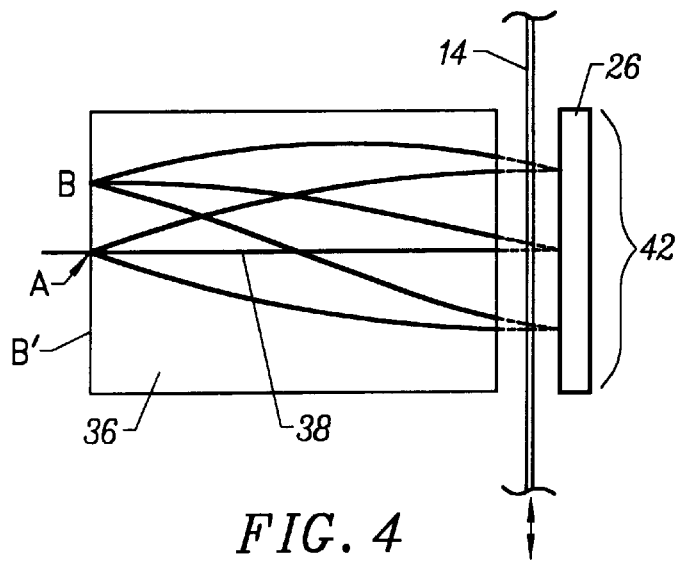
FIG. 4 schematically illustrates the operation of the GRIN lens of the attenuator of FIG. 1 for radially expanding an input signal, and also for focusing the reflected signal back into an output fiber.

Referring now to FIG. 4, GRIN lens 36 is used to both radially expand and collimate the optical signal from the input fiber, and also refocuses the optical signal into the output fiber. As more fully explained in co-pending U.S. patent application Ser. No. 08/623,489, filed Mar. 28, 1996 (now abandoned), the full disclosure of which is incorporated by reference, GRIN lens 36 will collimate and radially expand an optical signal introduced at a point A along its axial center line 38. By properly aligning reflector 26 relative to the GRIN lens, the reflected optical signal can be focused at a point P slightly off the longitudinal axis 38. In fact, where reflector 26 is precisely perpendicular to the longitudinal axis, the single quarter pitch GRIN lens 36 acts as a half pitch GRIN lens, so that an optical signal which is input at a slightly off-center position such as B will be reflected and refocused at a reciprocal point B' relative to longitudinal axis 38. As illustrated in FIG. 3, the claddings of the input and output fibers 16, 18 maintain a distance between the cores of these two fibers when they fit snugly into opening 32 through ferrule 34. Where opening 32 is aligned with the longitudinal axis 38 of GRIN lens 36, and where mirror 26 is perpendicular to that axis, the signal from input fiber 16 will be substantially reflected by the mirror into the output fiber 18.

It should be noted that the explanation above of the positions of the fiber ends with respect to the longitudinal axes, as called for by the theoretical operation of the GRIN lens, is an idealization. Empirically, it has been found that fine adjustments may be required to achieve maximum performance of the attenuators of the present invention. Nonetheless, once ferrule 34, GRIN lens 36, and reflector 26 are aligned and held in a fixed relationship, in plane movement of filter 14 to vary the effective filter region 41 will not inadvertently degrade the coupling efficiency between the input and output fibers.

As is clear from FIG. 4, the optical path through attenuator 10 passes through filter 14 twice: once on its way from GRIN lens 36 to reflector 26, and once on its way from the reflector back toward the GRIN lens. Hence, the attenuator of the present invention provides enhanced attenuation for a given filter density. Advantageously, the radially expanded optical signal passes through a relatively large effective filter region, thereby minimizing the effect of any minute discontinuities or contaminants present in or on the filter.

It should be pointed out that while GRIN lens 36 is generally described as having a length of "a quarter pitch", coupling efficiency may be enhanced by varying the length somewhat from this theoretical ideal. For example, lenses of approximately 0.23 pitch are within the scope of the present invention. GRIN lens 36, as well as ferrule 34 and the ends of input and output fibers 16, 18 will often have antireflective coatings to enhance coupling, while reflector 26 will typically comprise a multi-layer dielectric mirror structure.

Figure 5:
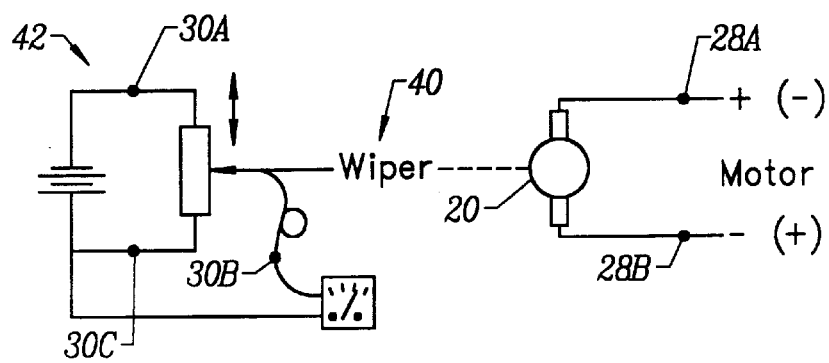
FIG. 5 schematically illustrates an electrical circuit for powering the motor, and for electrically sensing the position of the potentiometer to indicate the attenuation provided by the attenuator of FIG. 1.

The electrical and mechanical components of attenuator 10 are schematically illustrated in FIG. 5. As described above, motor 20 is energized through motor couplers 28A, 28B, to reversibly actuate a wiper 40 of a potentiometer 42. Motor 20 preferably comprises a geared miniature electric motor having a moderate reversible output to accurately position the wiper of the potentiometer. An exemplary miniature geared motor is available through Copal (U.S.A.) Inc., of Torrance, Calif., under Model No. LA12G-344. This motor has a rated voltage of 4.5 volts, and provides a torque of 500 g-cm with a speed of about 40 rpm.

Advantageously, attenuator 10 makes use of a potentiometer actuation mechanism to vary the position of filter 14 relative to the optical path. As can be understood with reference to FIGS. 5 and 6, potentiometer 42 indicates the axial position of wiper 40 through potentiometer couplers 30A, 30D, and 30C. Specifically, by applying voltage across couplers 30A and 30C, and measuring the voltage at coupler 30B, the axial position of wiper 40 can be determined.

Potentiometer 42 includes a body 44 that defines a wiper path 46. Wiper 40 moves along wiper path 46 in response to rotation of a screw 48. Electrical leads 50A, 50B, and 50C are coupleable to connectors 30A, 30B, and 30C, respectively. An exemplary potentiometer having this configuration is available from Bi-technologies Corporation of Fullerton, Calif., under Model No. 89PR5K.

Figure 6:
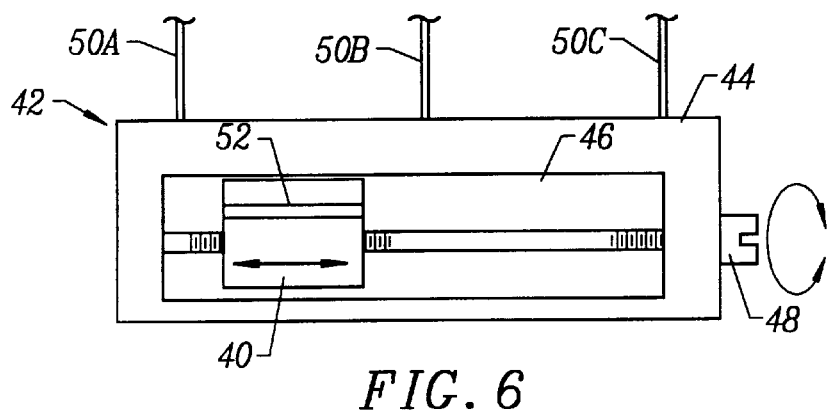
FIG. 6 illustrates an exemplary potentiometer which moves a variable filter between the GRIN lens and reflector to vary the effective filter density within the attenuator of FIG. 1.

As can be understood with reference to FIGS. 1, 5, and 6, the electrical signals provided through potentiometer couplers 30A, 30B, and 30C are varied by actuating screw 48 with the output from motor 20. Filter 14 can conveniently be mounted to wiper 40 at a groove or adhesive bond 52. By affixing housing 44 of potentiometer 42 relative to optical fiber assembly 24 and reflector 26, the wiper actuation mechanism provides in-plane movement of filter 14. Hence, the electrical signals from the potentiometer indicate which portion of the filter is disposed between the GRIN lens and reflector element. This simple structure allows repeatable positioning of a desired effective filter region with a very low cost structure.

Total package size can be minimized through the use of small potentiometers and driver motors. The exemplary potentiometer has a length of about 2 cm and a housing width of less than 1 cm. The overall attenuator package size of the exemplary embodiment is roughly 70 mm by 37 mm by 23 mm, and provides an attenuation dynamic range of roughly 35 dB for optical signals having wavelengths throughout the range of 1,200 to 1,600 nm. Residual attenuation will preferably be below 1.5 dB, ideally being below 0.4 dB, and the attenuator will have a tuning resolution of within roughly 0.2 dB. Reflective optical return loss of approximately 50 dB can be provided, with a polarization sensitivity of less than 0.2 dB. Attenuation can be varied throughout the entire attenuation range in approximately 20 seconds or less.

An alternative single-pass attenuator 60 is illustrated in FIG. 7. Single pass attenuator 60 includes many of the components of the attenuators described above with reference to FIGS. 1–6, but the optical signals here pass through filter 14 once between input fiber 16 and output fiber 18. To expand and refocus the optical signals, the input and output fibers 16, 18 will each have a dedicated single fiber collimating assembly 62. Single fiber collimating assemblies 62 will preferably include GRIN lenses as described above regarding collimating assemblies 24, but will typically include a ferrule adapted for use with a single optical fiber. Single fiber collimating assemblies 62 are held in alignment by bracket 64. This may facilitate aligning the GRIN lenses of single fiber collimating assembly 62 for efficient optical coupling, and may enhance stability of the attenuator.

Since the light signals pass through filter 14 a single time, residual attenuation can be quite low, the residual attenuation preferably being less than about 0.5 dB. The single pass attenuator structure also provides high temperature stability. These attenuators will often provide variations in attenuation of less than about 0.09 dB throughout a temperature range from about 0° C. to about 70° C., and for attenuations of between about 1 and 15 dB.

It should be noted that at these attenuation accuracies, variable attenuators may be sensitive to input and output optical fiber positions, particularly when the fibers have hard buffer layers. To reduce the effect of fiber bending on attenuation, a soft buffer layer fiber, such as 900 $\mu$m tight buffer soft white fiber, may be used. Nonetheless, input and output fiber positions may still have a significant impact on overall attenuation. Generally, these attenuators can exhibit temperature stabilities with variations of less than about 0.005 dB per degrees Centigrade. As illustrated in FIG. 8, overall attenuation repeatability (for example, in $1^{st}$, $2^{nd}$, $3^{rd}$, and $4^{th}$ measurements) is quite good, while polarization dependent losses (PDL) are quite low, PDL generally being less than about 0.03 dB.

A particular advantage of the single pass attenuator 60 of FIG. 7 can be understood with reference to FIG. 9. In general, light transmission interference effects of filter 14 will result in a slight ripple of the attenuation/wavelength curve. Fortunately, as the light signals pass through the filter only a single time in single pass attenuator 60, the amplitude of this ripple is quite low, ideally being less than about 0.3 dB. This is a particular advantage of the single pass attenuator over the multiple pass attenuator illustrated in FIG. 1. The dimensions of the single pass attenuator 60 are also quite compact, with the attenuator package preferably having a length of about 75.0 mm, a width of about 45.0 mm, and a height of about 15.0 mm.

While the exemplary embodiment has been described in some detail, for purposes of clarity of understanding, various modifications, alternative constructions, and equivalents will be obvious to those with skill in the art. For example, variable attenuation may alternatively be provided by a liquid crystal cell, cooperating polarizers, or the like. Thus, the scope of the present invention is limited solely by the appended claims.

What is claimed is:

1. A variable attenuator comprising:

an electrical component having a body that defines a linear path and an element which is movable along the path to vary an electrical characteristic of the component;

an input optical fiber having an end with a dejacketed end portion adjacent the end, the dejacketed end portion having a core surrounded by a cladding;

an output optical fiber affixed in an optical path of an optical signal from the input fiber, the output optical fiber having an end with a dejacketed end portion adjacent the end, the dejacketed end portion having a core surrounded by a cladding;

a reflector affixed in the optical path between the input fiber and the output fiber;

an optical filter having a filter density which varies between a lower density region and a higher density region along a linear filter axis parallel to the path, an effective region of the filter disposed in the optical path between the input fiber and the output fiber, the filter affixed to the element so that the effective filter region moves between the low density region and the high density region in response to the element of the component moving along the path, whereby the electrical characteristic of the component indicates effective filter density, the filter moveably disposed in the optical path between the input fiber and the reflector, the filter also moveably disposed in the optical path between the reflector and the output fiber;

a collimating GRIN lens disposed in the optical path between the input fiber and the output fiber for expanding and collimating the optical signal transmitted therebetween; and a ferrule, the end portion of the input fiber and the end portion of the output fiber disposed in a common lumen of the ferrule adjacent the collimating GRIN lens so that the cladding of the input fiber is in contact with the cladding of the output fiber adjacent the ends of the input and output fibers.

2. A variable attenuator as claimed in claim 1, wherein:

the component comprises a potentiometer and the element comprises a wiper; and the optical filter is coupled to the wiper so that the effective filter density and a resistance of the potentiometer vary jointly as the effective filter region moves between the low density region and the high density region when the wiper of the potentiometer moves along the path, the electrical characteristic comprising the resistance.

3. A variable attenuator as claimed in claim 2, further comprising a circuit coupled to the potentiometer to sense and indicate the resistance, whereby attenuation of the effective filter region is indicated.

4. A variable attenuator as claimed in claim 2, wherein the filter is mounted on the wiper.

5. A variable attenuator as claimed in claim 4, further comprising a rotatable screw coupling the wiper to the body so that the wiper translates along an axis of the screw when the screw rotates relative to the body.

6. A variable attenuator as claimed in claim 5, further comprising an electrical motor coupled to the screw to controllably rotate the screw relative to the body.

7. A variable attenuator as claimed in claim 1, which further includes an electric motor operatively connected to the electric component selectively to drive the element to move along the path.

8. A variable attenuator as claimed in claim 7, further comprising a housing, the electrical component and the electric motor being contained within the housing.

9. A variable attenuator as claimed in claim 1, wherein the unjacketed end portions comprise single mode fiber portions having a diameter of about 125 $\mu$m, and wherein the lumen has a diameter of about 250 $\mu$m.

10. A variable attenuator comprising:

a housing;

a potentiometer disposed within the housing, the potentiometer having a body that defines a linear path, a wiper, and a rotatable screw coupling the wiper to the body to translate the wiper along the path when the screw rotates relative to the body;

an input optical fiber having an end with a dejacketed end portion adjacent the end, the dejacketed end portion having a core surrounded by a cladding;

an output optical fiber having an end with a dejacketed end portion adjacent an end, the dejacketed end portion having a core surrounded by a cladding;

a sleeve holding the end portions of the input optical fiber and the output optical fiber relative to the housing so that the cladding of the input fiber is in contact with the cladding of the output fiber adjacent the ends;

a GRIN lens disposed in an optical path of an optical signal from the input fiber;

a reflector disposed in the optical path from the GRIN lens, the reflector aligned to direct the signal back through the GRIN lens and into the output fiber;

an optical filter having an effective filter region disposed in the optical path between the GRIN lens and the reflector, the filter having a filter density which increases from a lower density region to a higher density region, the filter affixed to the wiper so that the effective region moves between the low density region and the high density region in response to the wiper moving relative to the body when the screw rotates; and a circuit coupled to the potentiometer to sense an electrical signal which indicates a position of the wiper along the path, whereby effective attenuation of the attenuator is also indicated.

11. A variable attenuator as claimed in claim 10, wherein the GRIN lens and reflector are affixed to the housing, and further comprising an electrical motor coupled to the screw to controllably rotate the screw relative to the housing.

12. A variable attenuator as claimed in claim 11, wherein the electrical motor is mounted within the housing.

13. A variable attenuator as claimed in claim 12, which includes electrical motor connectors on the housing and which are electrically connected to the electrical motor.

14. A variable attenuator as claimed in claim 10, wherein the potentiometer is mounted within the housing.

15. A variable attenuator as claimed in claim 14, which includes potentiometer connectors on the housing and which are electrically connected to the potentiometer.

16. A variable attenuator as claimed in claim 10, wherein the sleeve defines a slant angled face which is in close proximity to a reciprocally slanted face of the GRIN lens.

* * * * *